(12) United States Patent
Nosu et al.

(10) Patent No.: US 6,221,472 B1
(45) Date of Patent: Apr. 24, 2001

(54) POLYOLEFIN RESIN COMPOSITION AND ZINC-CONTAINING HYDROTALCITE PARTICLES

(75) Inventors: Tsutomu Nosu; Makoto Yoshii; Harumi Takabatake, all of Sakaide (JP)

(73) Assignee: Kyowa Chemical Industry Co Ltd, Kagawa (JP)

( * ) Notice: Subject to any disclaimer, the term of this patent is extended or adjusted under 35 U.S.C. 154(b) by 0 days.

(21) Appl. No.: 09/222,706

(22) Filed: Dec. 29, 1998

(30) Foreign Application Priority Data

Jan. 9, 1998 (JP) .................................................. 10-003214

(51) Int. Cl.⁷ .............................. B32B 5/16; C01B 31/30; C08K 3/10; C09C 2/04
(52) U.S. Cl. ........................ 428/220; 428/328; 428/523; 428/910; 106/419; 423/420.2; 524/115; 524/155; 524/401; 524/424; 524/437; 524/584; 524/586
(58) Field of Search ........................ 423/420.2; 106/419; 524/424, 437, 401, 584, 586, 115, 155; 428/328, 220, 523, 910

(56) References Cited

U.S. PATENT DOCUMENTS

| 3,879,525 | * | 4/1975 | Miyata et al. | 423/277 |
| 4,558,102 | * | 12/1985 | Miyata | 525/348 |
| 4,704,423 | * | 11/1987 | Iwanami et al. | 524/417 |
| 5,912,288 | * | 6/1999 | Nishimoto et al. | 524/114 |

FOREIGN PATENT DOCUMENTS

| 4732198 | * | 8/1972 | (JP) . |
| 52-49258 | * | 4/1977 | (JP) . |
| 55-80447 | * | 6/1980 | (JP) . |
| 61-113631 | * | 5/1986 | (JP) . |
| 7118490 | * | 5/1995 | (JP) . |

OTHER PUBLICATIONS

Database WPI, Section Ch, Week 7722, Derwent Publications Ltd., London, GB & JP 52 049258 A (Mitsubishi Petrochemical Co Ltd), Apr. 20, 1977.*
Database WPI, Section Ch, Week 9709, Derwent Publications Ltd., London, GB & JP 08 333490 (Tonen Kagaku KK), Dec. 17, 1996.*
Database WPI, Section Ch, Week 9536, Derwent Publications Ltd., London, GB & JP 07 173340 A (Tokuyama Soda KK), Jul. 11, 1995.*

* cited by examiner

Primary Examiner—Paul Thibodieau
Assistant Examiner—Ramsey Zacharia

(57) ABSTRACT

Zinc-containing hydrotalcite particles which satisfy the following requirements (1) to (4):
(1) the chemical composition should be represented by the following formula (A):

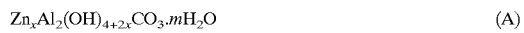

$$Zn_xAl_2(OH)_{4+2x}CO_3 \cdot mH_2O \quad \text{(A)}$$

wherein x and m satisfy $3.5 \leq x \leq 4.5$ and $0 \leq m \leq 4$, respectively, (2) the average secondary particle size should be 2 μm or less, preferably 0.3 to 1.5 μm,
(3) the amount of particles having a particle size of 10 μm or more out of all the particles should be 1 wt % or less, preferably 0.5 wt % or less, and
(4) the specific surface area measured by a BET method should be 20 m²/g or less, preferably 4 to 15 m²/g; and a resin composition comprising 0.001 to 5 parts by weight of the zinc-containing hydrotalcite particles based on 100 parts by weight of the polyolefin resin. This resin composition has excellent heat deterioration resistance, rust formation preventing properties, coloration preventing properties, dispersibility and filter permeability.

24 Claims, No Drawings

POLYOLEFIN RESIN COMPOSITION AND ZINC-CONTAINING HYDROTALCITE PARTICLES

DETAILED DESCRIPTION OF THE INVENTION

The present invention relates to a polyolefin resin composition which is obtained by blending specific hydrotalcite particles with a polyolefin resin to improve the heat deterioration resistance, rust preventing properties, coloration preventing properties, dispersibility and filter permeability of the resin. More specifically, it relates to a polyolefin resin composition which comprises specific hydrotalcite particles and a conventional phosphorus-containing antioxidant agent or/and a sulfur-containing antioxidant and a phenolic antioxidant and, particularly, to the improvement of coloration preventing properties, dispersibility, filter permeability and $NO_x$ resistance of a polyolefin resin.

The present invention relates to also novel hydrotalcite particles which are contained in a polyolefin resin composition to develop the above advantages.

Since plastics such as polyolefins are oxidized by attack of heat, light and the like to generate a radical and deteriorate acceleratedly, a phenolic antioxidant, phosphorus-containing antioxidant and sulfur-containing antioxidant, and further an ultraviolet absorber and hindered amine-based radical trapping agent have been used alone or in combination of two or more as an antioxidant and a radical trapping agent for these plastics. Meanwhile, while the step of removing a catalyst after polymerization is omitted due to an increase in the activity of a Ziegler-based catalyst, there arises a problem that a polyolefin resin contains several ppm or several hundreds of ppm of the remaining halogen which causes the heat deterioration of the resin or the formation of rust in a molding machine and the like. It is well known as a measure to overcome the above problem that calcium stearate and/or hydrotalcite particles having excellent dispersibility are used as an acid neutralizer or catalyst deactivating agent.

JP-A 55-80447 (the term "JP-A" as used herein means "Unexamined Japanese Patent Application"), for example, teaches that hydrotalcite particles represented by the following formula (to be referred to as "Mg-containing hydrotalcite particles" hereinafter): $Mg_{1-x}Al_x(OH)_2A^{n-}{}_{x/n} \cdot mH_2O$ ($0 \leq x \leq 0.5$, preferably $0.2 \leq x \leq 0.4$, A is an anion having a valence of n, and m is a positive number) are more effective than conventionally used calcium stearate or magnesium oxide in preventing the heat deterioration of a halogen-containing polyolefin resin, the formation of rust in a molding machine and coloration.

JP-A 61-113631 proposes that the processing stability and heat resistance of a polyolefin resin are improved effectively by blending a combination of the above Mg-containing hydrotalcite particles, a phenolic antioxidant and organic phosphate.

Although the polyolefin resin compositions having the above hydrotalcite particles have a coloration prevention effect, they are not satisfactory yet and are required to have higher stability.

Hydrotalcite particles which have heat deterioration resistance and rust preventing properties as well as coloration preventing properties, dispersibility and filter permeability which are satisfactory for polyolefin resins could not be obtained so far.

It is therefore an object of the present invention to provide a resin composition which can prevent the coloration such as yellowing or pinking of a polyolefin resin and which has excellent filter permeability, heat deterioration resistance and rust preventing properties.

The inventors of the present invention have conducted intensive studies to attain the above object and have found that the above object can be attained by hydrotalcite particles having specific properties and such chemical composition that the divalent metal of the hydrotalcite particles Is substituted by Zn.

JP-A 52-49258 proposes that Zn-containing hydrotalcite particles represented by the structural formula $M_xAl_y(OH)_{2x+3y-2z}(A)_z \cdot aH_2O$ (M is Mg, Ca or Zn, A is $CO_3$ or $HPO_4$, and x, y, z and a are "0" or a positive number) are mixed with a polyoelfin resin. It describes that a rust prevention effect is obtained with a small amount of the above hydrotalcite particles and even when the hydrotalcite particles are blended with a polyolefin containing a phenolic stabilizer, the yellowing of the polyolefin does not occur. However, the proposal does not mention at all what type of hydrotalcite particles should be used to obtain an excellent effect on preventing rust, deterioration or coloration. Most of the hydrotalcite particles listed in the publication are hydrotalcite particles containing Mg or Ca as M. Only Zn-containing hydrotalcite particles represented by the formula $Zn_6Al_2(OH)_{16}CO_3 \cdot 4H_2O$ are shown.

Further, JP-A 7-118490 proposes the use of hydrotalcite particles represented by the above formula as a resin composition which is not discolored as a package material even when it is contacted with a vegetable for a long time and has excellent properties of difficultly whitening, heat deterioration resistance and rust resistance. However, the proposal states that synthesized hydrotalcite particles containing Mg as a divalent metal (M) is preferred and hydrotalcite particles containing Zn as M are not used in Examples.

According to studies conducted by the present inventors, it has been found that when hydrotalcite particles represented by $Zn_xAl_2(OH)_{4+2x}CO_3 \cdot mH_2O$ are kneaded with a polyolefin resin, many problems such as uncertainty in yellowing resistance and heat stability, poor dispersibility into resins, deterioration in the appearance of a molded product, a reduction in filter permeability and the like arise. Therefore, the present inventors have conducted further intensive studies to find what kind of hydrotalcite particles containing Zn as a divalent metal (to be referred to as "ZnHT particles" hereinafter) should be used and have found that a polyolefin resin composition shown below is effective.

That is, it has been found that a polyolefin resin composition which has excellent coloration preventing properties, dispersibility and filter permeability while retaining rust preventing properties can be obtained by blending hydrotalcite particles represented by the following formula (A), having an average secondary particle size of 2 μm or less, containing 1 wt % or less of particles having a particle size of 10 μm or more and having a specific surface area measured by a BET method of 20 m²/g or less with a polyolefin containing halogen derived from a polymerization catalyst and/or post-halogenation in an amount of 0.001 to 5 parts by weight, preferably 0.01 to 1 part by weight based on 100 parts by weight of the polyolefin.

$$Zn_xAl_2(OH)_{4+2x}CO_3 \cdot mH_2O \qquad (A)$$

wherein x and m satisfy $3.5 \leq x \leq 4.5$ and $0 \leq m \leq 4$, respectively.

According to studies conducted by the present inventors, when ZnHT particles represented by $M_xAl_{y(OH)_{2x+3y-2z}}(A)_z \cdot aH_2O$ in which M is Zn are kneaded with a polyolefin, many technical problems such as uncertainty in yellowing resistance and heat stability, poor dispersibility into resins, deterioration in the appearance of a molded product, a reduction in filter permeability and the like arise. The reason for this is that ordinary ZnHT particles agglomerate firmly and re-agglomerate even when they are ground because they have a BET specific surface area of 30 m²/g or more and a crystal size, measured by an X-ray diffraction method, of about 100 to 300 Å at the <006> face in the C axial direction and are fine crystals with great surface energy. Therefore, it was found that ZnHT particles having good dispersibility could not be obtained.

After the present inventors have conducted further studies, they could form ZnHT particles which have an average secondary particle size of 2 μm or less, contain 1 wt % or less of particles having a particle size of 10 μm or more, have a specific surface area measured by a BET method of 20 m²/g or less, preferably 4 to 15 m²/g and rarely re-agglomerate by synthesizing ZnHT represented by the above formula (A), washing it fully, and hydrothermally aging it at a relatively low temperature of about 80 to 130° C. to grow crystals having a size of at least 600Å, preferably at least 700 Å, at the <006> face so as to reduce distortion. It has been found that a resin composition comprising the ZnHT particles is advantageous.

According to the findings of the present inventors, the ZnHT particles hydrothermally aged under the above conditions and having the above properties are novel ZnHT particles and have not been known at all up till now.

According to the present invention, there is provided zinc-containing hydrotalcite particles which satisfy the following requirements (1) to (4).

(1) The chemical structure should be represented by the following formula (A):

$$Zn_xAl_2(OH)_{4+2x}CO_3 \cdot mH_2O \qquad (A)$$

wherein x and m satisfy $3.5 \leq x \leq 4.5$ and $0 \leq m \leq 4$, respectively.

(2) The average secondary particle size should be 2 μm or less, preferably 0.3 to 1.5 μm.

(3) The amount of particles having a particle size of 10 μm or more should be 1 wt % or less, preferably 0.5 wt % or less of the total of all the particles.

(4) The specific surface area measured by a BET method should be 20 m²/g or less, preferably 4 to 15 m²/g.

According to the present invention, there is further provided a polyolefin resin composition comprising a polyolefin resin and zinc-containing hydrotalcite particles which satisfy the above requirements (1) to (4) in an amount of 0.001 to 5 parts by weight, preferably 0.01 to 1 part by weight based on 100 parts by weight of the polyolefin resin.

The zinc-containing hydrotalcite particles which satisfy the above requirements (1) to (4) in the present invention can be produced by obtaining ZnHT using Zn as a divalent metal (M) in place of Mg or Ca in the conventionally known hydrotalcite production method and hydrothermally aging the ZnHT under the following conditions. That is, ZnHT containing zinc as the divalent metal (M) is produced, for example, in accordance with a method disclosed by JP-B 47-32198 (corresponding to U.S. Pat. No. 3,879,525) (the term "JP-B" as used herein means "Examined Japanese Patent Publication") and then the obtained particles are heat-treated in an aqueous medium under the following conditions.

Stated more specifically, the zinc-containing hydrotalcite particles of the present invention can be obtained by reacting a water-soluble zinc compound with a water-soluble aluminum compound in the presence of an alkali substance in an aqueous medium to form zinc-containing hydrotalcite particles and heat-treating the particles in an aqueous medium at a temperature of 80 to 130° C. for 5 to 30 hours.

It is advantageous that the above reaction should be generally carried out at a temperature of 10 to 50° C., preferably 15 to 45° C. and the above heat treatment be carried out at a temperature of 90 to 120° C. The above heat treatment is carried out for 5 to 30 hours, preferably 7 to 25 hours.

The water-soluble zinc compound used in the reaction is selected from zinc chloride, zinc nitrate, zinc sulfate and alkali metal zincates.

The water-soluble aluminum compound is selected from aluminum chloride, aluminum nitrate, aluminum sulfate and alkali metal aluminates. The alkali substance is selected from caustic alkali (such as caustic soda or potassium potash) and alkali carbonate (such as sodium carbonate, potassium carbonate, sodium bicarbonate or potassium bicarbonate). An inorganic acid such as sulfuric acid or hydrochloric acid may be added in the reaction as required. The reaction is desirably carried out at a pH of about 6.0 to 11, preferably about 8.0 to 10.0.

It is advantageous that the ZnHT particles obtained by the reaction should be fully washed with water after solid-liquid separation. The ZnHT particles having the desired properties of the present invention can be obtained by heat-treating the ZnHT particles in an aqueous medium at a temperature of 80 to 130° C., preferably 90 to 120° C. for 5 to 30 hours, preferably 7 to 25 hours.

It was observed through a microscope or electron microscope that a large amount of columnar zinc oxide was formed by thermally aging the ZnHT particles at the above temperature range when the value of "x" in the expression (A) exceeded the above range, even in the case of ZnHT particles having crystal size at the <006> face of at least 600 Å. The ZnHT particles have not only low dispersibility into resins but also low filter permeability and transparency. When the value of "x" falls below the above range, aluminum hydroxide is formed along with the growth of crystals and the particles have low dispersibility.

Further, even though the ZnHT particles have a value of "x" within the above range, an average secondary particle size of 2 μm or less and a specific surface area measured by the BET method of 20 m²/g or less, if the heat-treating temperature in the aqueous medium is lower than 80° C., the dispersion of the particles becomes unsatisfactory because particles having a particle diameter of 10 μm or more are contained in an amount of several percents to several tens of percents and when the temperature is higher than 130° C., columnar zinc oxide is formed and the particles have low dispersibility.

The ZnHT particles used in the present invention have an average secondary particle size of 2 μm or less, preferably 0.3 to 1.5 μm, and a specific surface area measured by the BET method of 20 m²/g or less, preferably 4 to 15 m²/g. It is advantageous that particles having a particle diameter of 10 μm or more should be contained in an amount of 1 wt % or less, preferably 0.5 wt % or less of the total of all the particles.

When the ZnHT particles in the present invention are mixed with a polyolefin resin, a resin composition having excellent coloration prevention properties, dispersibility and filter permeability as well as excellent heat deterioration resistance and rust preventing properties can be obtained. When this resin composition is used, a film as thin as 5 to 30 μm, especially 5 to 25 μm, which cannot be obtained when ordinary ZnHT particles are used can be obtained. Further, the thread breakage of a fine filament of 1 denier, for example, can be suppressed. Surprisingly, it has been found that a molded product having the effect of suppressing coloration such as yellowing caused by nitrogen oxide exhausted from the engine of a car during transportation or storage can be provided.

In the present invention, the ZnHT particles can be surface treated with a surface treatment agent to further improve their compatibility with and dispersibility into resins. Surface treatment agents known per se may be used.

Illustrative examples of the surface treatment agent include higher fatty acids such as stearic acid, oleic acid and lauric acid and alkali metal salts thereof; silane-based and titanate-based coupling agents such as vinyltriethoxysilane, γ-aminopropyl trimethoxysilane and isopropyltriisostearoyl titanate; glycerin fatty acid esters such as glycerin monostearate and glycerin monooleate; and the like. Since ZnHT's contain water of crystallization, a foaming problem may be encountered when ZnHT's having a high concentration are added to a polyolefin and molded. Therefore, a product which is baked at 150 to 300° C. can be used.

According to the present invention, there is provided a polyolefin resin composition which comprises a polyolefin resin and zinc-containing hydrotalcite (ZnHT) particles which satisfy the above requirements (1) to (4) in an amount of 0.001 to 5 parts by weight, preferably 0.01 to 1 part by weight based on 100 parts by weight of the polyolefin resin.

The polyolefin used in the composition of the present invention is advantageously a polyolefin resin containing halogen derived from a polymerization catalyst and/or posthalogenation. The polyolefin resin is a copolymer polymerized using a Ziegler catalyst, metallocene catalyst or chromium catalyst. Illustrative examples of the polyolefin include poly-α-olefins and α-olefin copolymers such as low-density polyethylene, high-density polyethylene, linear low-density polyethylene, polypropylene, propylene-ethylene copolymer, polybutene-1, poly-3-methylbutene, poly-4-methylpentene and ethylene-vinyl acetate copolymer.

When a phosphorus-containing antioxidant and/or sulfur-containing antioxidant is further contained in the polyolefin resin composition of the present invention in an amount of 0.01 to 1 part by weight based on 100 parts by the polyolefin resin, a more excellent effect can be obtained. Further, when a phenol-containing antioxidant is added in an amount of 0.01 to 1 part by weight based on 100 parts by weight of the polyolefin resin, a much more excellent effect can be obtained.

The phosphorus-containing antioxidant in the present invention is those generally used in the polyolefin resin. Illustrative examples thereof include phosphite compounds and phosphonite compounds such as distearyl pentaerythritol diphosphite, bis(2,4,6-tri-t-butylphenyl)pentaerythritol diphosphite, tris(2,4-di-t-butylphenyl)phosphite, tetrakis(2,4-di-t-butylphenyl)4,4'-biphenylene phosphonite, cyclic neopentane tetrabis(2,4-di-t-butylphenyl)phosphite, bis(2,6-di-t-butyl-4-methylphenyl)pentaerythritol diphosphite, 2,2'-ethylidenebis(4,6-di-t-butylphenyl)fluorophosphite, trisphenyl phosphite, tristridecyl phosphite, tris(monononylphenyl)phosphite, tris(mono, dinonylphenyl)phosphite, tris(2-t-butylphenyl)phosphite, tris(2,4-di-t-butyl-5-methylphenyl)phosphite, tris(2,5-di-t-butylphenyl)phosphite, tris(2-t-butylphenyl)phosphite, tris[2-(1,1-dimethylpropyl)phenyl]phosphite, tris[2,4-di-(1,1-dimethylpropyl)phenyl]phosphite, tris(2-cyclohexylphenyl)phosphite, trisphenyl phosphite, tris(octylthioethyl) phosphite, tris(octylthiopropyl)phosphite, tris(cresylthiopropyl)phosphite, tris(3,5-di-t-butyl-4-hydroxyphenyl)phosphite, 4,4'-butylidene-bis(3-methyl-4-6-t-butylphenyl-di-tridecyl)phosphite, 4,4'-butylidene-bis(3-methyl-4-6-t-butylphenyl-di-octyl)phosphite, 1,1,3-tris(2-methyl-4-ditridecylphoshite-5-t-butylphenyl)butane, bis(2,4-di-t-butylphenyl)spiropentaerythritol diphosphite, bis(2,6-di-t-butyl-4-ethylphenyl)spiropentaerythritol-diphosphite, bis(2,4,6-tri-t-butylphenyl)spiropentaerythritol diphosphite, tetrakis(2,4-di-t-butylphenyl)-4,4'-bisphenylene-diphosphonite and tetrakis(2,4-di-t-butyl-5-methylphenyl)-4,4'-biphenylene phosphonite.

The sulfur-containing antioxidant in the present invention is those generally mixed with a polyolefin resin, as exemplified by dilauryl 3,3'-thiodipropionate, dimyristyl 3,3'-thiodipropionate, distearyl 3,3'-thiodipropionate and the like.

The phenol-containing antioxidant in the present invention is those generally used as an additive for a polyolefin resin by itself. Illustrative examples thereof include 2,6-di-t-butyl-p-cresol, 2,6-diphenyl-4-octadecyloxyphenol, stearyl-(3,5-di-t-butyl-4-hydroxyphenyl)propionate, distearyl-3,5-di-t-butyl-4-hydroxybenzyl phosphonate, thiodiethylenebis[(3,5-di-t-butyl-4-hydroxyphenyl) propionate], 4,4-thiobis(6-t-butyl-m-cresol), 2-octylthio-4, 6-di-(3,5-di-t-butyl-4-hydroxyphenoxy)-S-triazine, 2,2'-methylenebis(4-methyl-6-t-butylphenol), 2,2'-methylenebis(4-ethyl-6-t-butylphenol), bis[3,5-bis(4-hydroxy-3-t-butylphenyl)butyric acid]glycol ester, 4,4'-butylidenebis(6-t-butyl-m-cresol), 2,2'-ethylidenebis(4,6-di-t-butylphenol), 2,2'-ethylidenebis(4-s-butyl-6-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl] terephthalate, 1,3,5-tris(2,6-dimethyl-3-hydroxy-4-t-butylbenzyl)isocyanurate, 1,3,5-tris(3,5-di-t-butyl-4-hydroxybenzyl)isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl]isocyanurate, tetrakis[methylene-3-(3,5-d-t-butyl-4-hydroxyphenyl) propionate]methane and the like.

The polyolefin resin composition of the present invention may contain commonly used additives such as a benzotriazole-based or benzophenone-based ultraviolet absorber, hindered amine-based, benzoate-based or nickel-based photostabilizer, a metal salt of zinc, sodium or calcium, of stearic acid or hydroxystearic acid, antistatic agent, nucleating agent, pigment, pigment dispersant, viscosity adjusting agent, lubricant, copper damage preventing agent, anti-blocking agent and the like in limits not prejudicial to the object of the present invention.

The ZnHT particles contained in the polyolefin resin composition of the present invention have excellent dispersibility, a small average particle diameter and a small content of particles having a particle diameter of 10 μm or more. Therefore, a high-quality stretched thin film can be obtained from the resin composition. For example, a film having a thickness of 5 to 100 μm, preferably 10 to 30 μm can be obtained.

EXAMPLES

The following examples are provided for the purpose of further illustrating the present invention but are in no way to be taken as limiting.

Preparation of hydrotalcites;

The method of preparing hydrotalcites (samples A to H) used in the following examples and comparative examples is described below and the physical properties of the hydrotalcites are shown in Table 1 below.

Sample A: 4 liters of a 1 mol/liter ("liter" will be abbreviated as "L" hereinafter) aqueous solution of zinc chloride and 1 liter of a 1 mol/L aqueous solution of aluminum sulfate were charged into a 15-liter reactor, and a mixture of 6 liters of a 2 mols/L aqueous solution of NaOH and 1 liter of a 1 mol/L aqueous solution of sodium carbonate was added dropwise to the resulting mixture under agitation until the pH of the resulting mixture reached 9.5. After the solid-liquid separation of the obtained reaction product, impurities were removed by washing, and the reaction product was re-emulsified to a concentration of 50 g/L and hydrothermally aged at 120° C. for 20 hours. The obtained slurry was surface treated with 2% of sodium stearate, dehydrated, washed, dried at 100° C. and powdered with a hammer mill to prepare a test sample.

Sample B: A mixed solution of 4.5 liters of a 1 mol/L aqueous solution of zinc sulfate and 1 liter of a 1 mol/L aqueous solution of aluminum sulfate and a mixed solution of 6.5 liters of a 2 mols/L aqueous solution of NaOH and 1 liter of a 1 mol/L aqueous solution of sodium carbonate were simultaneously poured into a reactor filled with water under agitation until the pH of the resulting mixture reached 9. After the solid-liquid separation of the obtained slurry, impurities were removed by washing, and the slurry was re-emulsified to a concentration of 50 g/l and hydrothermally aged at 110° C. for 15 hours. The obtained slurry was treated in the same manner as Sample A.

Sample C: Sample C was prepared exactly in the same manner as Sample A except that hydrothermal aging was carried out at 150° C. for 20 hours.

Sample D: A mixed solution of 6 liters of a 1 mol/L aqueous solution of zinc chloride and 1 liter of a 1 mol/L aqueous solution of aluminum sulfate and a mixed solution of 8 liters of a 2 mols/L aqueous solution of NaOH and 1 liter of a 1 mol/L aqueous solution of sodium carbonate were simultaneously poured into a reactor filled with water under agitation until the pH of the resulting mixture reached 9.5. After the solid-liquid separation of the obtained reaction product, impurities were removed by washing, and the product was re-emulsified to a concentration of 50 g/l. The obtained slurry was treated with 2% of sodium stearate, dehydrated, washed, dried at 100° C. and powdered with a hammer mill for testing to prepare Sample D.

Sample E: A mixed solution of 5 liters of a 1 mol/L aqueous solution of zinc nitrate and 1 liter of a 2 mols/L aqueous solution of aluminum nitrate and a mixed solution of 7 liters of a 2 mols/L aqueous solution of NaOH and 1 liter of a 1 mol/L aqueous solution of sodium carbonate were simultaneously poured into a reactor filled with water under agitation until the pH of the resulting mixture reached 10. After the solid-liquid separation of the obtained reaction product, impurities were removed by washing, and the product was re-emulsified to a concentration of 50 g/L and hydrothermally aged at 120° C. for 13 hours. The obtained slurry was treated in the same manner as Sample A to prepare Sample E.

Sample F: A mixed solution of 3 liters of a 1 mol/L aqueous solution of zinc sulfate and 1 liter of a 1 mol/L aqueous solution of aluminum sulfate and a mixed solution of 5 liters of a 2 mols/L aqueous solution of NaOH and 1 liter of a 1 mol/L aqueous solution of sodium carbonate were simultaneously poured into a reactor filled with water under agitation until the pH of the resulting mixture reached 9.5. After the solid-liquid separation of the obtained slurry, impurities were removed by washing, and the slurry was re-emulsified to a concentration of 50 g/L and hydrothermally aged at 120° C. for 13 hours. The obtained slurry was treated in the same manner as Sample A to prepare Sample F.

Sample G: Sample G was prepared exactly in the same manner as Sample A except that hydrothermal aging was carried at 70° C. for 20 hours. Sample H: Commercially available hydrotalcite (DHT-4A of Kyowa Chemical Industry Co., Ltd.) was used.

TABLE 1

| sample No. | compositional formula | secondary particle diameter average ($\mu$m) | secondary particle diameter 10 $\mu$m or more (wt %) | specific surface area measured by BET method ($m^2$/g) | X-ray diffraction <006> face (Å) |
|---|---|---|---|---|---|
| A | $Zn_4Al_2(OH)_{12}CO_3 \cdot 3H_2O$ | 1.1 | 1.0≧ | 8.8 | 1080 |
| B | $Zn_{4.5}Al_2(OH)_{13}CO_3 \cdot 3H_2O$ | 0.7 | 1.0≧ | 10.5 | 730 |
| C | $Zn_4Al_2(OH)_{12}CO_3 \cdot 3H_2O$ | 1.3 | 3.5(columnar) | 8.5 | 640 |
| D | $Zn_6Al_2(OH)_{16}CO_3 \cdot 5H_2O$ | 14.5 | 22.8 | 96.0 | 150 |
| E | $Zn_5Al_2(OH)_{14}CO_3 \cdot 4H_2O$ | 1.2 | 3.3(columnar) | 8.4 | 400 |
| F | $Zn_3Al_2(OH)_{10}CO_3 \cdot 2H_2O$ | 12.3 | 55.6 | 30.0 | 600 |
| G | $Zn_4Al_2(OH)_{12}CO_3 \cdot 3H_2O$ | 2.9 | 7.0 | 20.5 | 540 |
| H | $Mg_{4.5}Al_2(OH)_{13}CO_3 \cdot 3.5H_2O$ | 0.6 | 1.0≧ | 9.3 | 860 |

The average secondary particle size, specific surface area measured by the BET method, X-ray diffraction at <006> face, heat deterioration resistance, coloration, rust preventing properties, dispersibility, filter permeability and NOx resistance of each of the above samples were measured as follows.

Average secondary particle size:

A sample prepared by powdering dry hydrotalcite particles with a hammer mill was damped with ethanol, injected into a 1 wt % aqueous solution of hexametaphosphoric acid to prepare an 1 wt % aqueous slurry. The slurry was dispersed by ultrasonic waves for 3 minutes and measured using the Microtrac (laser diffraction scattering method: Nikkiso Co., Ltd.). The particle size of columnar particles was measured by observation through a microscope in accordance wtih a Luzex method. As for the measurement method, 1 mg of a sample was collected on a glass plate, a dispersant was added to and kneaded with the sample, the resulting dispersion was placed on cover glass and measured for the size of the particles and the number of particles using the Luzex 401 particle counter (of Nippon Regulator Co., Ltd.).

Specific surface area measured by BET method:

This was obtained by a 3-plot method in accordance with a nitrogen adsorption process based on the condition that the molecular adsorption section of $N_2$ was 16.2 Å$^2$. After each sample was subjected to evacuation under vacuum at 100° C. for 30 minutes, a nitrogen adsorption test was made.

Measurement of <006> face by X-ray diffraction:

This was calculated from the Scherrer's expression at a half width having a diffraction peak 20 at the <006> face of about 23.5° using the RINT2000 of Rigaku Denki Co., Ltd.

Heat deterioration resistance:

Pellets were formed by extruding a resin composition comprising 0.05 part by weight of hydrotalcite particles with a kneading extruder at 230° C. 5 times continuously. The melt flow rate (MFR) of a polypropylene resin was measured under a load of 2.16 kg/cm$^2$ at 230° C. for 10 minutes, while the MFR of a polyethylene resin was measured at 190° C. under a load of 21.6 kg/cm$^2$. The rate of change in the melt flow rate of the first extrudate to that of the fifth extrudate was taken as heat deterioration resistance. The smaller the change rate the higher the heat deterioration resistance becomes.

Coloration preventing properties:

Pellets formed in the same manner as above were press molded at 230° C. for 5 minutes to form a 2 mm-thick plate. The coloration of this plate was evaluated by yellow index (Y.I). The larger the value the more the plate is colored (measured with the ZE-2000 of Nippon Denshoku Kogyo Co., Ltd.)

Rust preventing properties:

A 40 mm×40 mm soft steel plate well polished and degreased was embedded into a resin composition pellets containing 0.05 part of the sample hydrotalcite particles, heated at 230° C. for 1 hour, taken out from the sample and cooled, and the resin was removed. Thereafter, the soft steel plate was placed in a desiccator whose relative humidity was adjusted to 93% and left at room temperature for 1 week, and the formation of rust in this soft steel was evaluated by the eye.
1. No rust was formed.
2. The whole soft steel was slightly rusted
3. The whole soft steel was heavily rusted. .

The dispersibility of hydrotalcite particles was judged based on the number of white grains contained in the A4-size area (21×29.6 cm).
1. One or less white grains
2. 2 to 5 white grains
3. 6 to 10 white grains
4. 11 to 20 white grains
5. 21 or more white grains Filter permeability:

When a resin composition comprising 1 part by weight of hydrotalcite particles was extruded by a kneading extruder at 230° C., a filer of 300 meshes was attached to a die and a pressure rise was checked. The pressure at the time of extruding 5 kg of the resin composition was measured.

NOx resistance:

Pellets prepared by extruding a resin composition comprising 0.05 part by weight of hydrotalcite particles with a kneading extruder at 230° C. were formed into a 100 μm-thick film by a film molding machine, and the film was left for 1 week in a closed container of which NOx content was adjusted to 1,000 ppm. The coloration of the obtained film was expressed by Y.I.

Examples 1 and 2 and Comparative Examples 1 to 7

Samples A to H of hydrotalcite particles shown above were each blended into a halogen-containing polypropylene resin composition obtained by using a highly active catalyst and having a melt flow rate (MFR) of 6 to prepare test pieces. The evaluation results of the test pieces are shown in Table 2.

Composition propylene-ethylene copolymer (Cl content of 35 ppm) . . . 100 parts by weight 1,3,5-tris(3,5-di-t-butyl-4-hydroxybenzyl)isocyanurate . . . 0.05 part by weight tris(2,4-di-t-butylphenyl)phosphite . . . 0.05 part by weight hydrotalcite particles . . . 0.05 parts by weight

TABLE 2

| | sample No. of hydrotalcite particles | heat deterioration resistance MFR change rate (Rate of change in MFR) (%) | rust preventing properties | coloration preventing properties (Y.I) | filter permeability (Kg/cm$^2$) | NOx resistance (Y.I) | dispersibility |
|---|---|---|---|---|---|---|---|
| Ex. 1 | A | +31 | 1 | 19.7 | 45 | 14.2 | 1 |
| Ex. 2 | B | +33 | 1 | 21.4 | 47 | 14.3 | 1 |
| C. Ex. 1 | C | +33 | 1 | 21.8 | 69 | 14.8 | 3 |
| C. Ex. 2 | D | +39 | 2 | 22.2 | 85 | 15.2 | 5 |
| C. Ex. 3 | E | +34 | 1 | 22.5 | 71 | 14.3 | 4 |
| C. Ex. 4 | F | +36 | 2 | 23.3 | 96 | 15.4 | 5 |
| C. Ex. 5 | G | +34 | 1 | 21.8 | 65 | 15.0 | 4 |
| C. Ex. 6 | H | +31 | 1 | 27.8 | 42 | 17.3 | 1 |
| C. Ex. 7 | none | +55 | 3 | 32.0 | 33 | 15.8 | 1 |

Ex.: Example, C. Ex.: Comparative Example

Dispersibility:

An extruded pellet having the following composition was formed into a T-die cast film by a film molding machine, the film was stretched to 10 times by a biaxial stretching machine, and the stretched film was evaluated by the eye.

Examples 3 and 4 and Comparative Examples 8 to 10

The above hydrotalcite particles were each blended into a halogen-containing high-density polyethylene resin composition obtained by using a highly active catalyst and having an MFR of 13.0 to prepare test pieces. The evaluation results of the test pieces are shown in Table 3.

Composition high-density polyethylene (Cl content=85 ppm) . . . 100 parts by weight stearyl-(3,5-di-t-butyl-4-hydroxyphenyl)propionate . . . 0.05 part by weight cyclic neopentane tetra-bis (2,4-di-t-butyl)phosphite . . . 0.05 part by weight hydrotalcite particles . . . 0.05 part by weight

TABLE 3

| sample No. of hydrotalcite particles | heat deterioration resistance (Rate of change in MFR) (%) | rust preventing properties | coloration preventing properties (Y.I) | filter permeability (Kg/cm$^2$) | dispersibility |
|---|---|---|---|---|---|
| Ex. 3 | A | +5 | 1 | 7.2 | 100 | 1 |
| Ex. 4 | B | +7 | 1 | 7.9 | 115 | 1 |
| C. Ex. 8 | D | +10 | 2 | 9.8 | 153 | 5 |
| C. Ex. 9 | G | +5 | 1 | 12.1 | 120 | 1 |
| C. Ex. 10 | none | +17 | 3 | 17.5 | 85 | 1 |

Ex.: Example, C. Ex.: Comparative Example

Examples 5 and 6 and Comparative Examples 11 to 17

Test pieces having the following compositions were prepared from the polypropylene resin used in Example 1. The evaluation results of the test pieces are shown in Table 4.

Composition:

propylene-ethylene copolymer (Cl content=35 ppm) . . . 100 parts by weight pentaerythrityl-tetrakis[3-(3,5-di-t-butyl-4-hydroxyphenyl)propionate] . . . 0.1 part by weight dilauryl thiodipropionate . . . 0.1 part by weight hydrotalcite particles . . . 0.05 part by weight Examples 7 and 8 and Comparative Examples 18 to 22

Pellets were formed by adding a stabilizer to commercially available linear low-density polyethylene having a Cl content of 40 ppm (LLDPE; UF240 of Nippon Polychem Co., Ltd.) obtained by adding anhydrous magnesium chloride so as to have the following composition and extruding the resulting mixture with a kneading extruder at 190° C. Each of the pellets was formed into a 100 μm-thick T-die film and 750 hours of an accelerated weathering test was made on the film with a Sunshine weather meter. After the accelerated weather test, the film was formed into a JIS K7127 No. 4 test piece which was then used for a tensile test. The results are shown in Table 5.

Composition

LLDPE (Cl content=40 ppm) . . . 100 parts by weight

TINUVIN662LD (of Ciba Geigy Co., Ltd.) . . . 0.1 part by weight pentaerythrityl-tetrakis[3-(3,5-di-t-butyl-4-hydroxyphenyl)propionate] . . . 0.05 part by weight tris(2,4-di-t-butylphenyl)phosphite . . . 0.05 part by weight (note: TINUVIN662LD12 is a hindered amine-based photostabilizer.)

TABLE 4

| sample No. of hydrotalcite particles | heat deterioration resistance (Rate of change in MFR) (%) | rust preventing properties | coloration preventing properties (Y.I) | filter permeability (Kg/cm$^2$) | NOx resistance (Y.I) | dispersibility |
|---|---|---|---|---|---|---|
| Ex. 5 | A | +40 | 1 | 10.4 | 40 | 12.5 | 1 |
| Ex. 6 | B | +41 | 1 | 10.7 | 42 | 12.7 | 1 |
| C. Ex. 11 | C | +43 | 1 | 11.2 | 66 | 12.7 | 3 |
| C. Ex. 12 | D | +45 | 2 | 12.1 | 83 | 12.9 | 5 |
| C. Ex. 13 | E | +43 | 1 | 12.1 | 67 | 12.8 | 3 |
| C. Ex. 14 | F | +44 | 2 | 12.7 | 80 | 13.0 | 4 |
| C. Ex. 15 | G | +43 | 1 | 11.4 | 63 | 12.8 | 3 |
| C. Ex. 16 | H | +40 | 1 | 14.5 | 39 | 13.5 | 1 |
| C. Ex. 17 | none | +45 | 3 | 16.1 | 31 | 13.3 | 1 |

Ex.: Example, C. Ex.: Comparative Example

TABLE 5

| sample No. of hydrotalcite particles | | tensile strength Kgf/mm² (retention %) | elongation retention (%) |
|---|---|---|---|
| Ex. 7 | A | 2.08 (60.1) | 100 |
| Ex. 8 | B | 2.12 (61.3) | 96 |
| C. Ex. 18 | D | 1.50 (43.1) | 77 |
| C. Ex. 19 | F | 1.65 (47.7) | 80 |
| C. Ex. 20 | H | 2.12 (61.2) | 105 |
| C. Ex. 21 | Ca-st | 0.92 (26.4) | 42 |
| C. Ex. 22 | none | 0 (0) | 0 |

Example 9

A 80 μm-thick package film for foods was formed by adding 1,000 ppm of each of Samples A, D and H of hydrotalcite particles to commercially available linear low-density polyethylene (LLDPE) having an MFR of 2.0 and a density of 0.92 with a blow film molding machine having a die temperature of 210° C. and a discharge rate of 50 kg/hr in accordance with an inflation method. Before film formation, the linear low-density polyethylene and the hydrotalcite particles were kneaded together at a temperature of 190° C. using a single-screw kneader to form pellets.

When the resulting products were evaluated by the eye, fish eyes and melt fracture (surface roughness) were not observed in the product obtained from Sample A but many fish eyes were observed in the product obtained from Sample D. No fish eye was observed but a slight melt fracture was seen in the product obtained from Sample H.

According to the present invention, it is possible to provide a resin composition which can be processed continuously for a longer time than conventional ZnHT particles and enables the blending of components which are more resistant to coloration because hydrotalcite particles retain high coloration preventing properties and excellent filter permeability of a polyolefin resin without losing the heat deterioration resistance and rust preventing properties of conventional hydrotalcite particles. It is also possible to provide a resin composition having excellent storage stability due to improved NOx resistance.

Further, according to the present invention, there are provided novel ZnHT particles which are advantageously contained in the above resin composition.

What is claimed is:

1. A polyolefin resin composition comprising a polyolefin resin and zinc-containing hydrotalcite particles which satisfy the following requirements (1) to (4) in an amount of 0.001 to 5 parts by weight based on 100 parts by weight of the polyolefin resin:
    (1) the chemical structure is represented by the following formula (A):

$$Zn_xAl_2(OH)_{4+2x}CO_3 \cdot mH_2O \quad (A)$$

wherein x and m satisfy $3.5 \leq x \leq 4.5$ and $0 \leq m \leq 4$, respectively,
    (2) the average secondary particle size is 2 μm or less,
    (3) the amount of particles having a particle size of 10 μm or more is 1 wt % or less of the total of all the particles, and
    (4) the specific surface area measured by a BET method is 20 m²/g or less.

2. The resin composition of claim 1, wherein the zinc-containing hydrotalcite particles have a crystal size at the <006> face measured by X-ray diffraction of at least 600 Å.

3. The resin composition of claim 1 which comprises the zinc-containing hydrotalcite particles in an amount of 0.01 to 1 part by weight based on 100 parts by weight of the polyolefin resin.

4. The resin composition of claim 1, wherein the zinc-containing hydrotalcite particles have an average secondary particle size of 0.3 to 1.5 μm.

5. The resin composition of claim 1, wherein the zinc-containing hydrotalcite particles contain particles having a particle size of 10 μm or more in an amount of 0.5 wt % or less.

6. The resin composition of claim 1, wherein the zinc-containing hydrotalcite particles have a specific surface area measured by a BET method of 4 to 15 m²/g.

7. The resin composition of claim 1 which further comprises a phosphorus-containing antioxidant and/or a sulfur-containing antioxidant in an amount of 0.01 to 1 part by weight based on 100 parts by weight of the polyolefin resin.

8. The resin composition of claim 1 which further comprises a phenol-containing antioxidant in an amount of 0.01 to 1 part by weight based on 100 parts by weight of the polyolefin resin.

9. A molded product of the resin composition of claim 1.

10. A stretched film having a thickness of 5 to 30 μm formed from the resin composition of claim 1.

11. Zinc-containing hydrotalcite particles which satisfy the following requirement (1) to (4):
    (1) the chemical structure is represented by the following formula (A):

$$Zn_xAl_2(OH)_{4+2x}CO_3 \cdot mH_2O \quad (A)$$

wherein x and m satisfy $3.5 \leq x \leq 4.5$ and $0 \leq m \leq 4$, respectively,
    (2) the average secondary particle size is 2 μm or less,
    (3) the amount of particles having a particle size of 10 μm or more is 1 wt % or less of the total of all the particles, and
    (4) the specific surface area measured by a BET method is 20 m²/g or less.

12. The zinc-containing hydrotalcite particles of claim 11 which have a crystal size at the <006> face measured by X-ray diffraction of at least 600 Å.

13. The zinc-containing hydrotalcite particles of claim 11 which have an average secondary particle size of 0.3 to 1.5 μm.

14. The zinc-containing hydrotalcite particles of claim 11 which contain particles having a particle diameter of 10 μm or more in an amount of 0.5 wt % or less.

15. The zinc-containing hydrotalcite particles of claim 11 which have a specific surface area measured by a BET method of 4 to 15 m²/g.

16. The zinc-containing hydrotalcite particles of claim 11 which have a crystal size at the <006> face measured by X-ray diffraction of 700 to 1,200 Å.

17. A process for producing the zinc-containing hydrotalcite particles of claim 11 comprising reacting a water-soluble zinc compound with a water-soluble aluminum compound in the presence of an alkali substance in an aqueous medium to form zinc-containing hydrotalcite particles and heat-treating the particles in an aqueous medium at a temperature of 80 to 130° C. for 5 to 30 hours.

18. The production process of claim 17, wherein the reaction is carried out at a temperature of 10 to 50° C.

19. The production process of claim 17, wherein the heat treatment is carried out at a temperature of 90 to 120° C.

20. A polyolefin resin composition comprising a polyolefin resin and zinc-containing hydrotalcite particles which satisfy the following requirements (1) to (4) in an amount of 0.01 to 1 parts by weight based on 100 parts by weight of the polyolefin resin:

(1) the chemical structure is represented by the following formula (A):

$$Zn_xAl_2(OH)_{4+2x}CO_3 \cdot mH_2O \qquad (A)$$

wherein x and m satisfy $3.5 \leq x \leq 4.5$ and $0 \leq m \leq 4$, respectively, (2) the average secondary particle size is 0.3 to 1.5 μm, (3) the amount of particles having a particle size of 10 μm or more is 0.5 wt % or less of the total of all the particles, and (4) the specific surface area measured by a BET method is 4 to 15 m²/g.

21. A molded product of the resin composition of claim 20.

22. A stretched film having a thickness of 5 to 30 μm formed from the resin composition of claim 20.

23. Zinc-containing hydrotalcite particles which satisfy the following requirements (1) to (4):

(1) the chemical structure is represented by the following formula (A):

$$Zn_xAl_2(OH)_{4+2x}CO_3 \cdot mH_2O \qquad (A)$$

wherein x and m satisfy $3.5 \leq x \leq 4.5$ and $0 \leq m \leq 4$, respectively, (2) the average secondary particle size is 0.3 to 1.5 μm, (3) the amount of particles having a particle size of 10 μm or more is 0.5 wt % or less of the total of all the particles, and (4) the specific surface area measured by a BET method is 4 to 15 m²/g.

24. The zinc-containing hydrotalcite particles of claim 23 which have a crystal size at the <006> face measured by X-ray diffraction of 700 to 1,200 Å.

* * * * *